United States Patent
Sugiura et al.

(10) Patent No.: US 8,304,140 B2
(45) Date of Patent: Nov. 6, 2012

(54) FUEL CELL SEPARATOR COMPRISING OVERLAPPING BOSSES AND GUIDE RIDGES

(75) Inventors: Seiji Sugiura, Utsunomiya (JP); Yasuhiro Watanabe, Kawaguchi (JP); Shuji Sato, Utsunomiya (JP); Takahiro Takai, Utsunomiya (JP); Masaaki Sakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 12/813,937

(22) Filed: Jun. 11, 2010

(65) Prior Publication Data

US 2010/0316924 A1 Dec. 16, 2010

(30) Foreign Application Priority Data

Jun. 12, 2009 (JP) ................... 2009-141123

(51) Int. Cl.
  *H01M 8/04* (2006.01)
  *H01M 8/10* (2006.01)
  *H01M 8/24* (2006.01)
(52) U.S. Cl. ......... 429/514; 429/457; 429/444; 429/483
(58) Field of Classification Search .................. 429/454, 429/434, 468, 480, 518, 457, 444, 483, 514
  See application file for complete search history.

(56) References Cited

U.S. PATENT DOCUMENTS

| 3,134,696 | A * | 5/1964 | Douglas et al. | 429/454 |
| 2006/0088752 | A1 * | 4/2006 | Sakano et al. | 429/34 |
| 2006/0204807 | A1 * | 9/2006 | Kosaka et al. | 429/26 |

FOREIGN PATENT DOCUMENTS

| JP | 8-222237 | 8/1996 |
| JP | 2003-142126 | 5/2003 |

OTHER PUBLICATIONS

Japanese Office Action for Application No. 2009-141123, dated Sep. 20, 2011.

* cited by examiner

*Primary Examiner* — Jonathan Crepeau
*Assistant Examiner* — Kenneth Douyette
(74) *Attorney, Agent, or Firm* — Nelson Mullins Riley & Scarborough LLP; Anthony A. Laurentano

(57) ABSTRACT

A fuel cell is formed by stacking first cell units and second cell units alternately. An inlet buffer and an outlet buffer are formed on a surface of a first metal separator of the first cell unit. Bosses are provided in the inlet buffer and the outlet buffer of the first metal separator. An inlet buffer and an outlet buffer are formed on a surface of the second metal separator of the first cell unit. Continuous guide ridges are formed in the inlet buffer and the outlet buffer of the second metal separator. The bosses and the continuous guide ridges are provided at positions overlapped with each other in the stacking direction.

2 Claims, 17 Drawing Sheets

FUEL CELL SEPARATOR COMPRISING OVERLAPPING BOSSES AND GUIDE RIDGES

CROSS-REFERENCE TO RELATED APPLICATION

This application is based upon and claims the benefit of priority from Japanese Patent Application No. 2009-141123 filed on Jun. 12, 2009, of which the contents are incorporated herein by reference.

BACKGROUND OF THE INVENTION

1. Field of the Invention

The present invention relates to a fuel cell formed by stacking a membrane electrode assembly and a metal separator in the form of a corrugated plate. The membrane electrode assembly includes a pair of electrodes and an electrolyte interposed between the electrodes. First and second flow fields as passages for any of a fuel gas, an oxygen-containing gas and a coolant are formed on both surfaces of the metal separator.

2. Description of the Related Art

For example, a solid polymer electrolyte fuel cell employs an electrolyte membrane (electrolyte). The electrolyte membrane is a polymer ion exchange membrane. The electrolyte membrane is interposed between an anode and a cathode to form a membrane electrode assembly (MEA). The membrane electrode assembly is sandwiched between a pair of separators to form a unit cell for generating electricity. In use, normally, a predetermined number of such unit cells are stacked together to form a fuel cell stack.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators.

In the case where metal separators are used as the separators, by providing grooves as the fuel gas flow field on one surface of the metal separator facing the anode, ridges as the back side of the grooves are formed on the other surface of the metal separator. Further, by forming grooves as the oxygen-containing gas flow field on one surface of the metal separator facing the cathode, ridges as the back side of the grooves are formed on the other surface of the metal separator.

For example, a fuel cell separator is disclosed in Japanese Laid-Open Patent Publication No. 08-222237. As shown in FIG. 17, the fuel cell separator includes a separator plate 1 and a separator frame 2. The separator plate 1 is made of metal, and bosses and dimples are formed on the separator plate 1. Specifically, a large number of projections 3, 4 are formed on the front and back surfaces of the separator plate 1 at intervals of several millimeters. When a fuel cell stack is assembled, the top portions of the projections 3, 4 tightly contact unit cells 5. A fuel gas flow field 6 is formed on the side of the projections 3 between the separator plate 1 and the adjacent unit cells 5. The oxygen-containing gas flow field 7 is formed on the side of the projections 4 between the separator plate 1 and the adjacent unit cells 5.

In the above separator plate 1, the fuel gas flow field 6 is formed by a large number of the projections 3, and the oxygen-containing gas flow field 7 is formed by a large number of the projections 4. Therefore, water produced in the power generation tends to be retained between the projections 3 or between the projections 4. At this time, since the fuel gas and the oxygen-containing gas flows between the projections 3 or the projections 4 around the water produced in the power generation, the water may not be discharged smoothly. Therefore, the flows of the fuel gas and the oxygen-containing gas are inhibited, and the power generation performance is lowered.

The fuel cell stack may adopt the so-called skip cooling structure where each coolant flow field is formed at intervals of a predetermined number of unit cells. For example, each of cell units of the fuel cell may be formed by stacking two membrane electrode assemblies and three metal separators together, and the coolant flow field may be formed in each space between the cell units.

However, in the cell unit, when each of the membrane electrode assembly is held between the projections of the separators on both sides of the membrane electrode assembly, the projections of the adjacent cell units are not in alignment with each other. Therefore, the separators tend to be deformed, and the membrane electrode assembly cannot be held reliably. As a result, the separators and the membrane electrode assembly are damaged, and the fluid does not flow along the membrane electrode assembly smoothly.

SUMMARY OF THE INVENTION

The present invention has been made to solve the problems of this type, and an object of the present invention is to provide a fuel cell in which a membrane electrode assembly is held reliably, and fluids smoothly flow along buffers.

The present invention relates to a fuel cell formed by stacking a membrane electrode assembly and a metal separator in a form of a corrugated plate in a stacking direction. The membrane electrode assembly includes a pair of electrodes, and an electrolyte interposed between the electrodes. A first fluid flow field and a buffer as a passage for one of a fuel gas, an oxygen-containing gas and a coolant is formed on one surface of the metal separator. A second fluid flow field and a buffer as a passage for another one of the fuel gas, the oxygen-containing gas and the coolant is formed on the other surface of the metal separator.

The fuel cell includes first and second metal separators. The membrane electrode assembly is sandwiched between the first and second metal separators or the first and second metal separators directly contact each other. Bosses are formed in the buffer of the first metal separator, and the bosses protrude toward the second metal separator. Continuous guide ridges are formed in the buffer of the second metal separator, and the continuous guide ridges protrude toward the first metal separator. The bosses and the continuous guide ridges are provided at positions overlapped with each other in the stacking direction.

In the present invention, the bosses of the first metal separator and the continuous guide ridges of the second metal separator are overlapped with each other in the stacking direction. Therefore, for example, the membrane electrode assembly can be held reliably between the bosses and the continuous guide ridges.

Further, the buffer includes the continuous guide ridges. Thus, by the guiding operation of the continuous guide ridges, the fluid flows smoothly, and the desired power generation performance is maintained reliably.

Further, in the case where the skip cooling structure is adopted, reduction in the size and weight is achieved easily.

Further, the continuous guide ridges are provided at the anode side. Therefore, in the fuel cell for performing power generation using pure hydrogen and oxygen, though the flow rate of the fuel gas is small on the anode side, the water is discharged from the anode smoothly. Thus, power generation is performed stably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
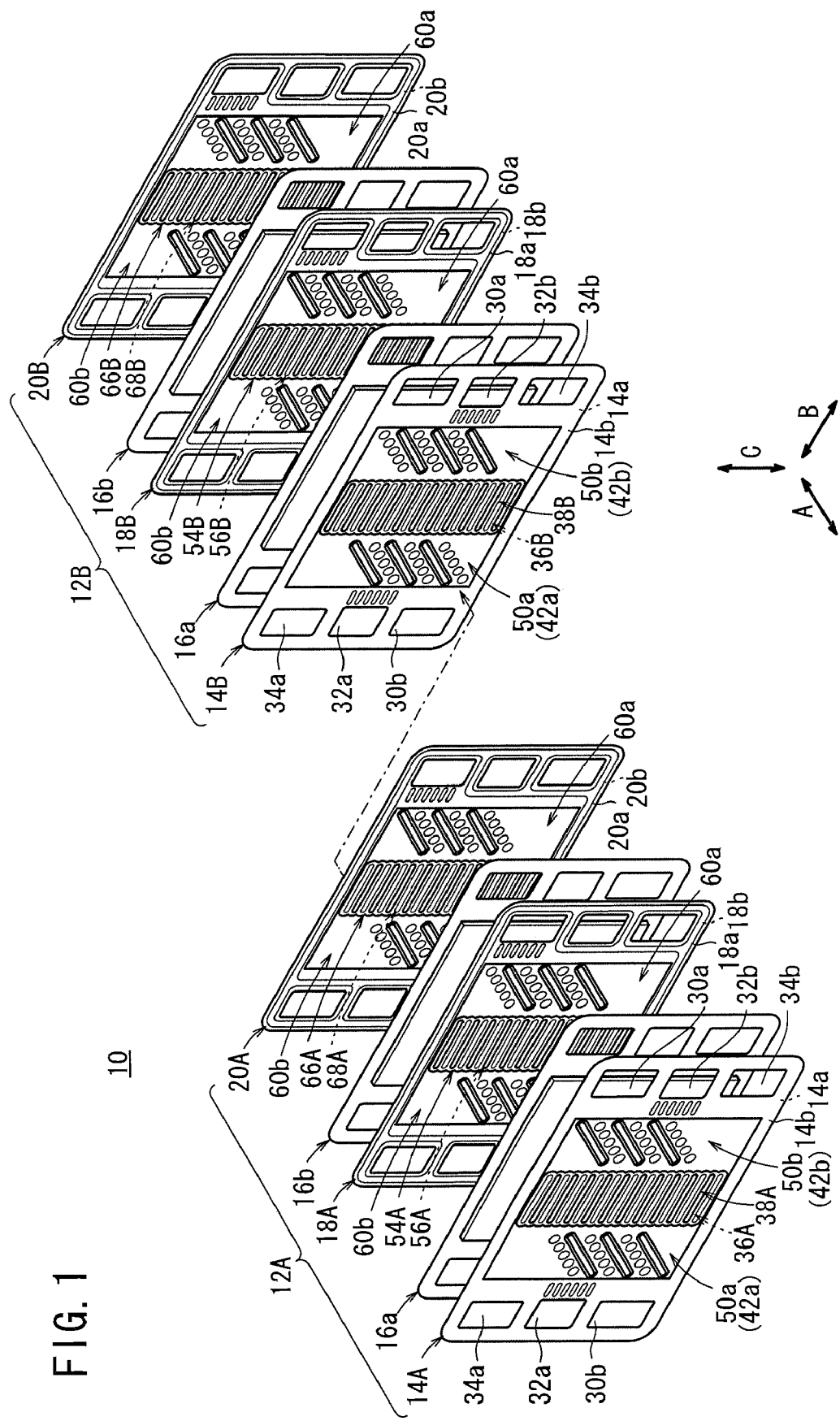
FIG. 1 is an exploded perspective view showing main components of a fuel cell according to a first embodiment of the present invention.

As shown in FIG. 1, a fuel cell 10 according to a first embodiment of the present invention is formed by stacking first cell units 12A and second cell units 12B alternately in a direction indicated by an arrow A.

Figure 2:
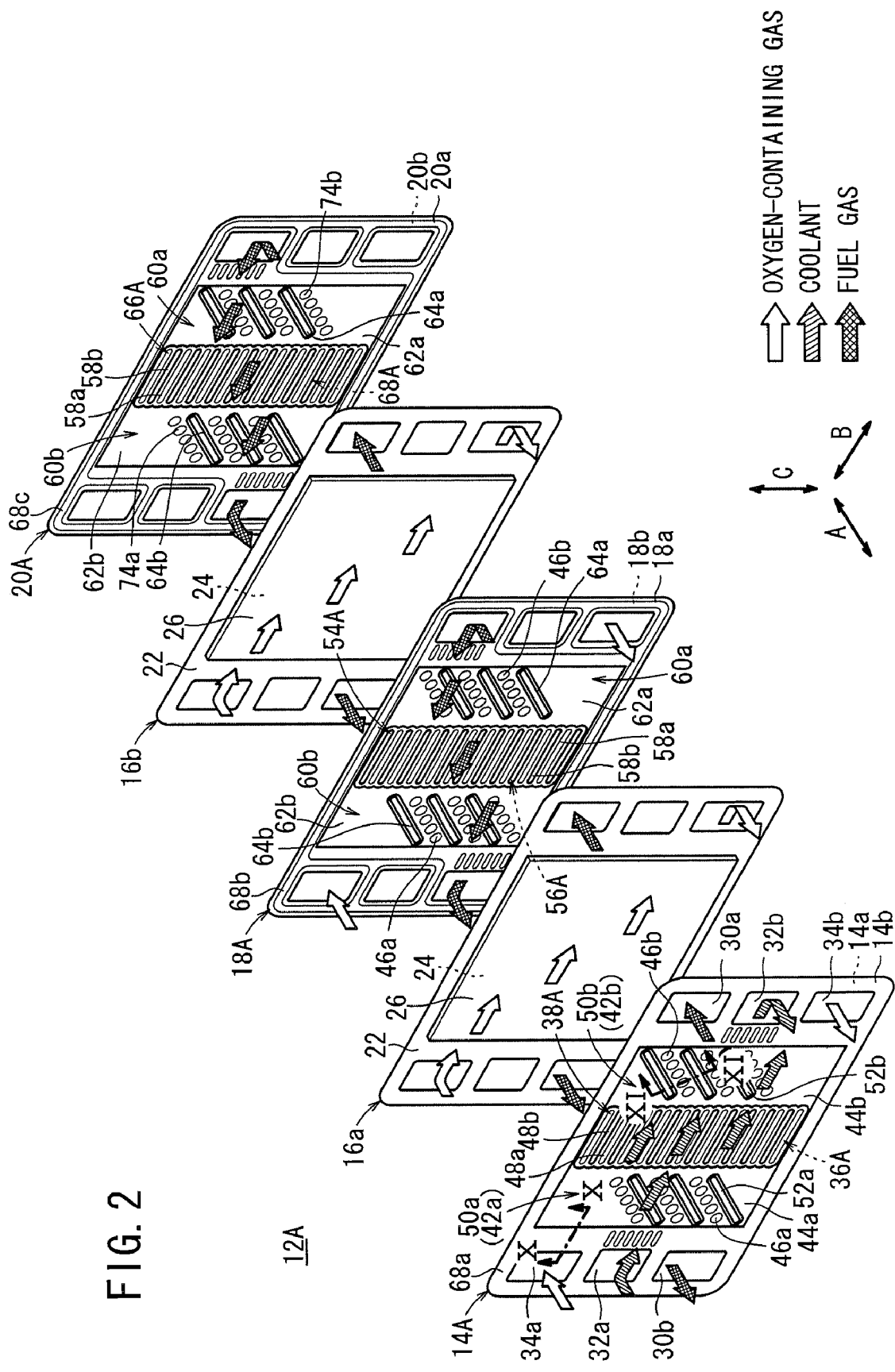
FIG. 2 is an exploded perspective view showing a first cell unit of the fuel cell.

As shown in FIG. 2, the first cell unit 12A includes a first metal separator 14A, a first membrane electrode assembly (MEA) 16a, a second metal separator 18A, a second membrane electrode assembly 16b, and a third metal separator 20A.

For example, the first metal separator 14A, the second metal separator 18A, and the third metal separator 20A are made of steel plates, stainless steel plates, aluminum plates, plated steel sheets, or metal plates having anti-corrosive surfaces by surface treatment. The first metal separator 14A, the second metal separator 18A, and the third metal separator 20A are formed by corrugating metal plates under pressure to have ridges and grooves.

For example, each of the first and second membrane electrode assemblies 16a, 16b includes an anode (electrode) 24, a cathode (electrode) 26, and a solid polymer electrolyte membrane (electrolyte) 22 interposed between the anode 24 and the cathode 26. The solid polymer electrolyte membrane 22 is formed by impregnating a thin membrane of perfluorosulfonic acid with water, for example. Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are formed on both surfaces of the solid polymer electrolyte membrane 22, respectively.

At one end of the first cell unit 12A in a longitudinal direction indicated by the arrow B, a fuel gas supply passage 30a for supplying a fuel gas such as a hydrogen containing gas, a coolant discharge passage 32b for discharging a coolant, and an oxygen-containing gas discharge passage 34b for discharging an oxygen-containing gas are provided. The fuel gas supply passage 30a, the coolant discharge passage 32b, and the oxygen-containing gas discharge passage 34b extend through the first cell unit 12A in the direction indicated by the arrow A.

At the other end of the first cell unit 12A in the longitudinal direction indicated by the arrow B, an oxygen-containing gas supply passage 34a for supplying the oxygen-containing gas, a coolant supply passage 32a for supplying the coolant, and a fuel gas discharge passage 30b for discharging the fuel gas are provided. The oxygen-containing gas supply passage 34a, the coolant supply passage 32a, and the fuel gas discharge passage 30b extend through the first cell unit 12A in the direction indicated by the arrow A.

Figure 3:
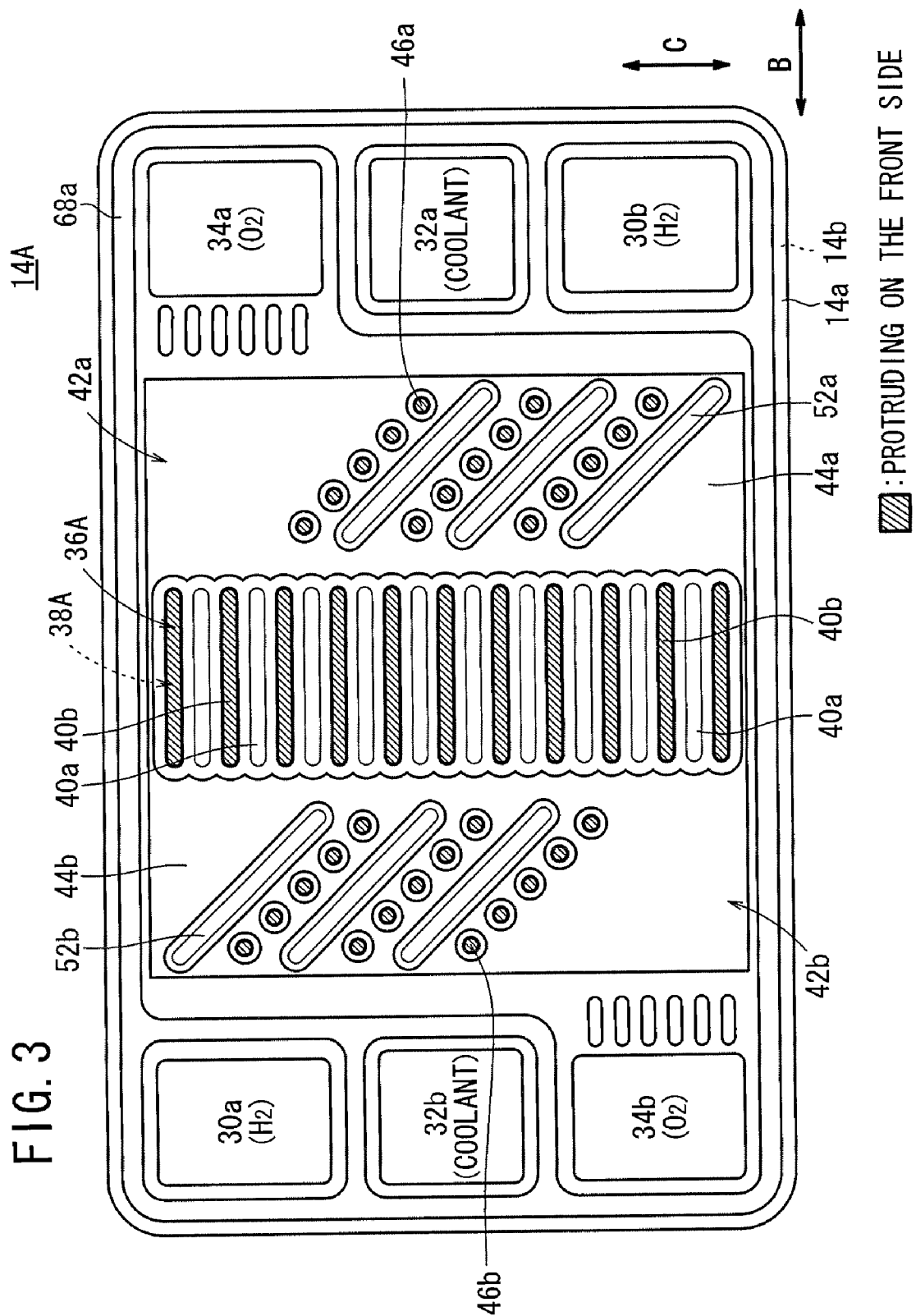
FIG. 3 is a front view showing a first metal separator of the first cell unit.

As shown in FIG. 3, the first metal separator 14A has a first oxygen-containing gas flow field (fluid flow field) 36A on its surface 14a facing the first membrane electrode assembly 16a. The first oxygen-containing gas flow field 36A is connected between the oxygen-containing gas supply passage 34a and the oxygen-containing gas discharge passage 34b. A first coolant flow field (fluid flow field) 38A is formed on a surface 14b of the first metal separator 14A, on the back of the first oxygen-containing gas flow field 36A.

The first oxygen-containing gas flow field 36A includes a plurality of straight flow grooves 40a along the power generation surface extending in the direction indicated by the arrow B. The straight flow grooves 40a are arranged in the direction indicated by the arrow C. An inlet buffer 42a and an outlet buffer 42b are provided adjacent to the inlet and the outlet of the straight flow grooves 40a, respectively. The straight flow grooves 40a are formed between straight flow field ridges 40b protruding from the surface 14a.

A plurality of bosses 46a are formed in the inlet buffer 42a. The bosses 46a protrude on the side of the first oxygen-containing gas flow field 36A from an intermediate height area 44a. A plurality of bosses 46b are formed in the outlet buffer 42b. The bosses 46b protrude on the side of the first oxygen-containing gas flow field 36A from an intermediate height area 44b. The bosses 46a, 46b are arranged in a plurality of rows spaced at predetermined intervals. Each row includes a group of a predetermined number of bosses 46a, 46b.

As shown in FIG. 2, the first coolant flow field 38A is formed on the other surface 14b of the first metal separator 14A, on the back of the first oxygen-containing gas flow field 36A. The first coolant flow field 38A includes a plurality of straight flow grooves 48a along the power generation surface extending in the direction indicated by the arrow B. The straight flow grooves 48a are arranged in the direction indicated by the arrow C. An inlet buffer 50a and an outlet buffer 50b are provided adjacent to the inlet and the outlet of the straight flow grooves 48a, respectively.

The straight flow grooves 48a are formed between straight flow field ridges 48b protruding from the surface 14a. The straight flow grooves 48a are formed on the back of the straight flow field ridges 40b. The straight flow field ridges 48b are formed on the back of the straight flow grooves 40a. The inlet buffer 50a is provided on the back of the inlet buffer 42a, and the outlet buffer 50b is formed on the back of the outlet buffer 42b.

Figure 4:
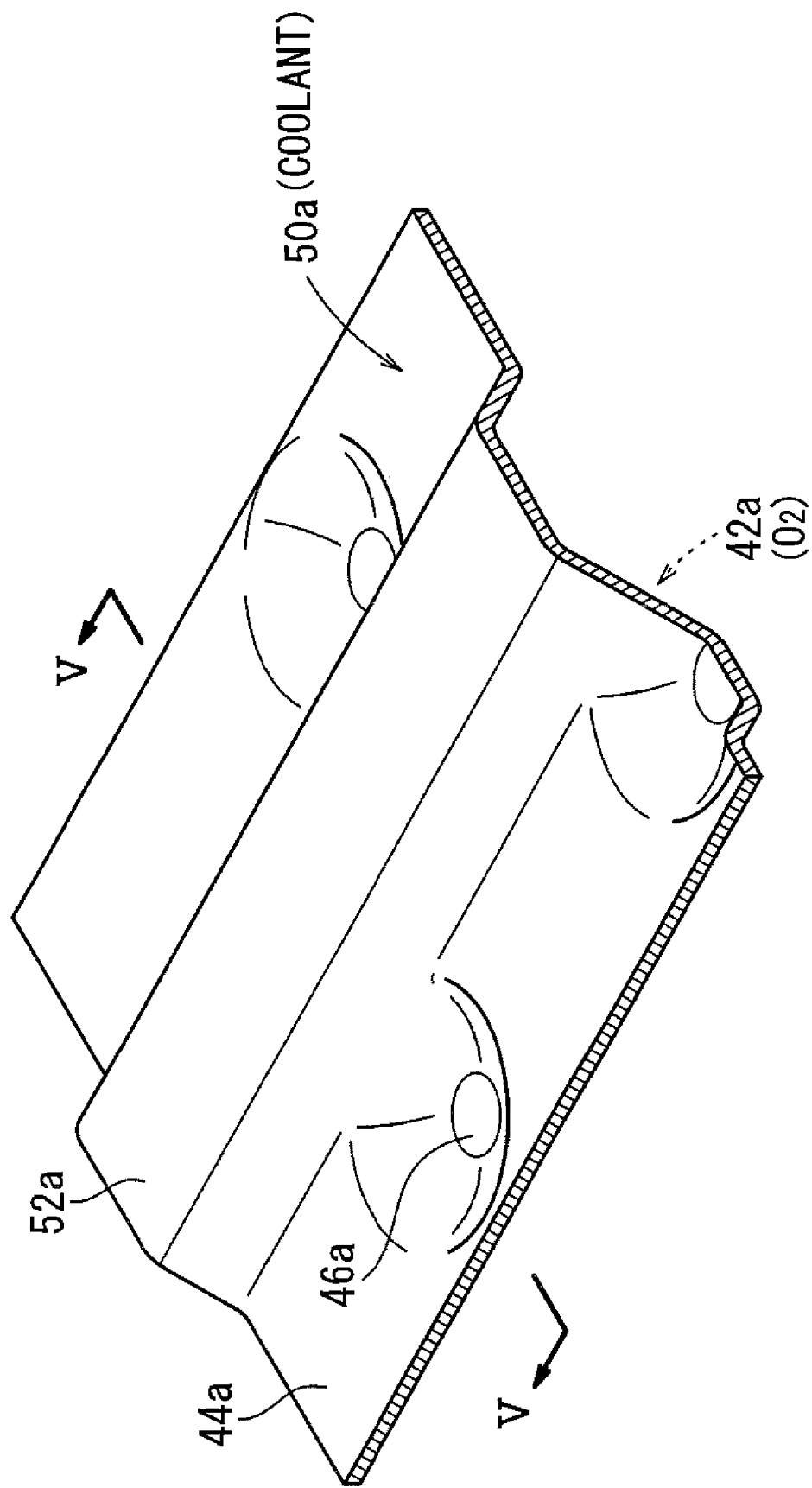
FIG. 4 is a perspective view showing part of an inlet buffer of the first metal separator.
Figure 5:
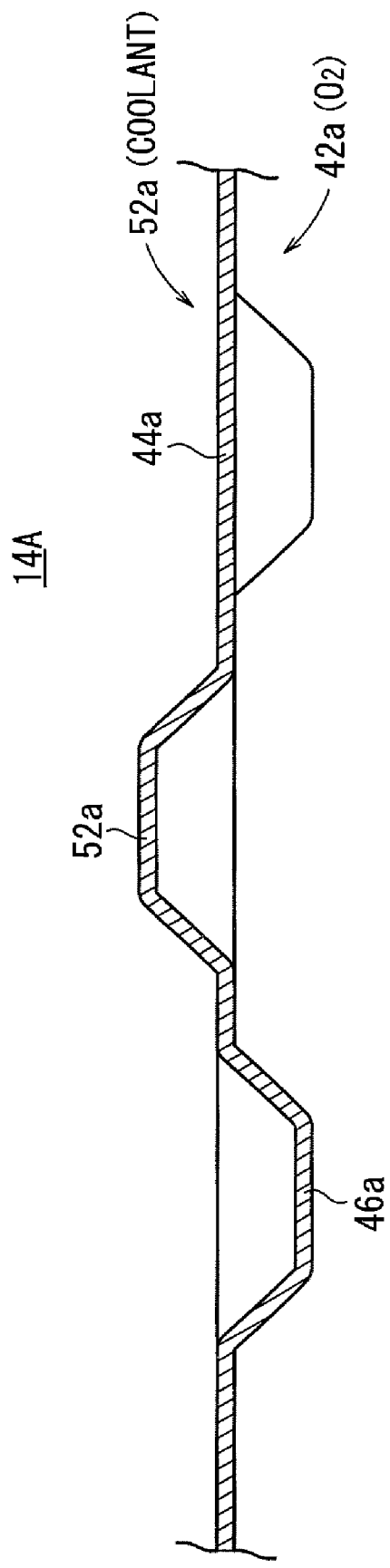
FIG. 5 is a cross sectional view showing the first metal separator, taken along a line V-V in FIG. 4.

As shown in FIGS. 4 and 5, the inlet buffer 50a includes continuous guide ridges 52a protruding from the intermediate height area 44a on the side of the first coolant flow field 38A. The depth of the continuous guide ridges 52a from the intermediate height area 44a is the same as the depth of the bosses 46a from the intermediate height area 44a.

As shown in FIG. 2, the outlet buffer 50b includes continuous guide ridges 52b protruding from the intermediate height area 44b on the side of the first coolant flow field 38A. Boss groups each including a predetermined number of bosses 46a in one row and the continuous guide ridges 52a are arranged alternately, and boss groups each including a predetermined number of bosses 46b in one row and the continuous guide ridges 52b are arranged alternately on the front and back of the first metal separator 14A.

Figure 6:
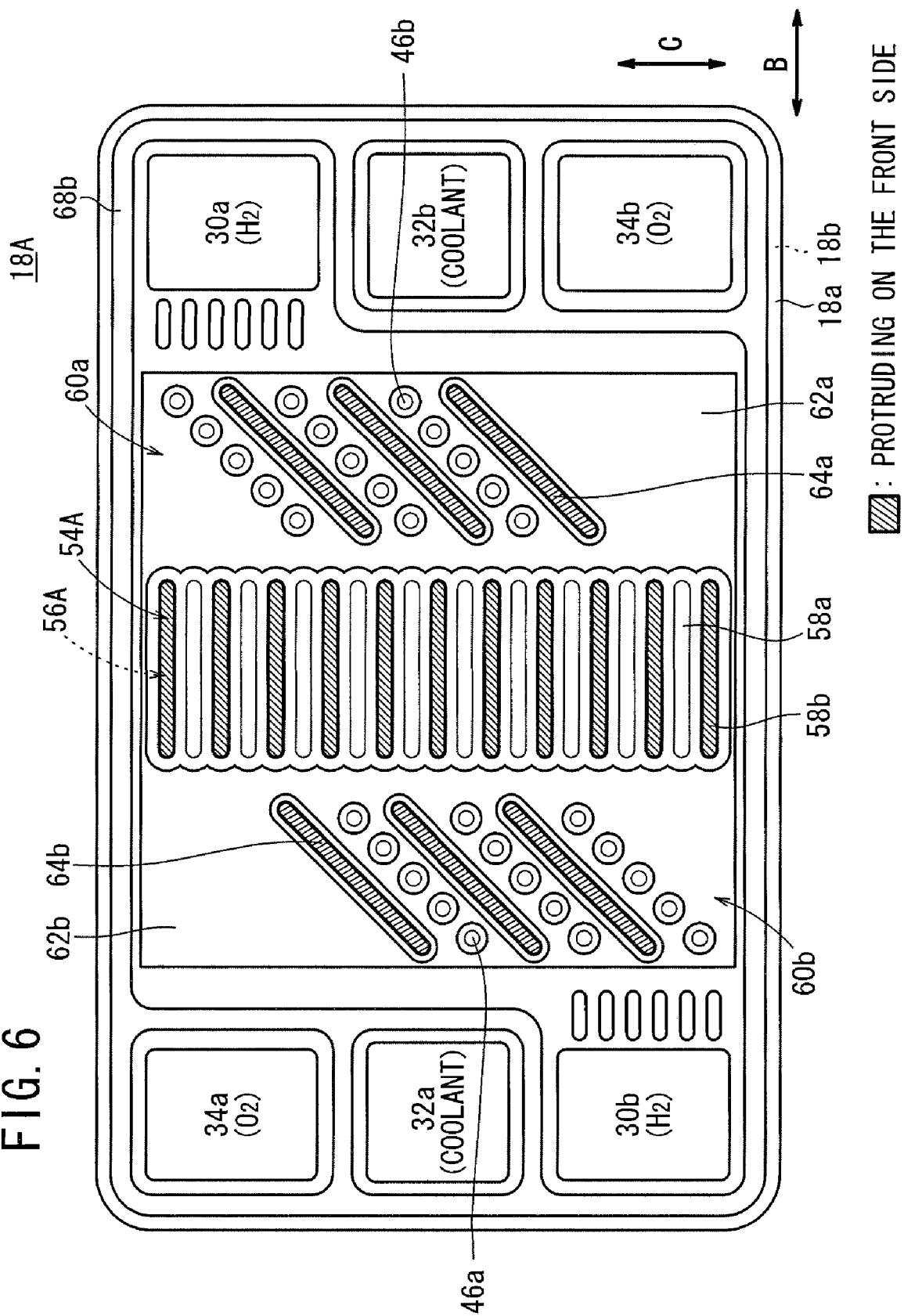
FIG. 6 is a view showing one surface of a second metal separator of the first cell unit.

As shown in FIG. 6, the second metal separator 18A has a first fuel gas flow field (fluid flow field) 54A on its surface 18a facing the first membrane electrode assembly 16a of the second metal separator 18A. The second metal separator 18A has a second oxygen-containing gas flow field (fluid flow field) 56A on its surface 18b facing the second membrane electrode assembly 16b, on the back of the first fuel gas flow field 54A.

The first fuel gas flow field 54A includes a plurality of straight flow grooves 58a along the power generation surface extending in the direction indicated by the arrow B.

The straight flow grooves 58a are arranged in the direction indicated by the arrow C. An inlet buffer 60a and an outlet buffer 60b are provided adjacent to the inlet and the outlet of the straight flow grooves 58a, respectively. The straight flow grooves 58a are formed between straight flow field ridges 58b protruding from the surface 18a.

The inlet buffer 60a includes continuous guide ridges 64a protruding from an intermediate height area 62a on the side of the first fuel gas flow field 54A. The continuous guide ridges 64a are provided to guide the fuel gas from the fuel gas supply passage 30a to the straight flow grooves 58a. The outlet buffer 60b includes continuous guide ridges 64b protruding from an intermediate height area 62b on the side of the first fuel gas flow field 54A. The continuous guide ridges 64b are provided to guide the fuel gas from the straight flow grooves 58a to the fuel gas discharge passage 30b.

Figure 7:
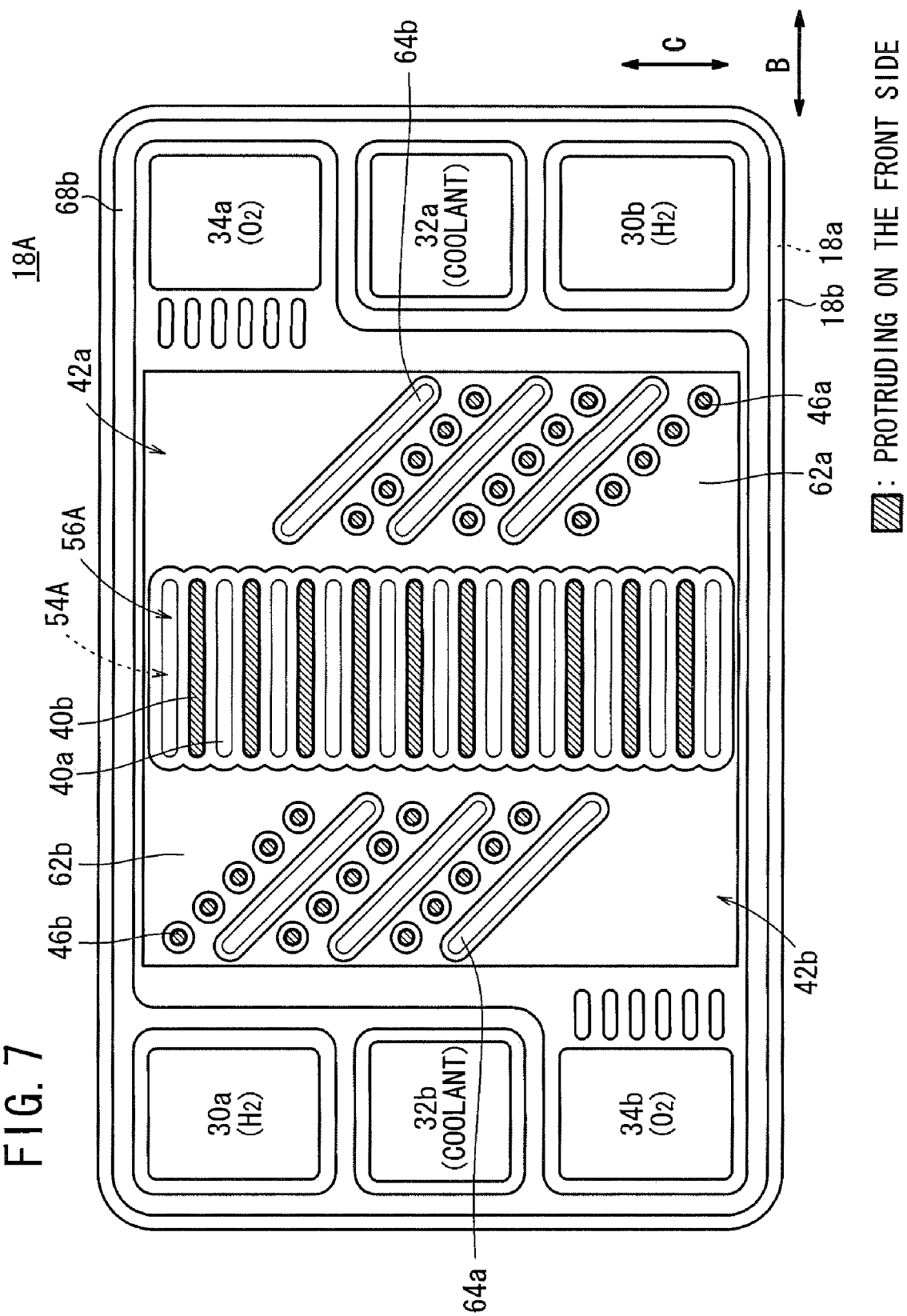
FIG. 7 is a view showing the other surface of the second metal separator of the first cell unit.

As shown in FIG. 7, a second oxygen-containing gas flow field 56A is formed on a surface 18b of the second metal separator 18A, on the back of the first fuel gas flow field 54A. The second oxygen-containing gas flow field 56A has the same structure as the first oxygen-containing gas flow field 36A. The constituent elements of the second oxygen-containing gas flow field 56A that are identical to those of the first oxygen-containing gas flow field 36A are labeled with the same reference numerals, and description thereof will be omitted.

The third metal separator 20A has a second fuel gas flow field (fluid flow field) 66A on its surface 20a facing the second membrane electrode assembly 16b, and has a second coolant flow field (fluid flow field) 68A on a surface 20b opposite to the surface 20a, on the back of the second fuel gas flow field 66A. The second fuel gas flow field 66A has the same structure as the first fuel gas flow field 54A. The constituent elements of the second fuel gas flow field 66A that are identical to those of the first fuel gas flow field 54A are labeled with the same reference numerals, and description thereof will be omitted.

Figure 8:
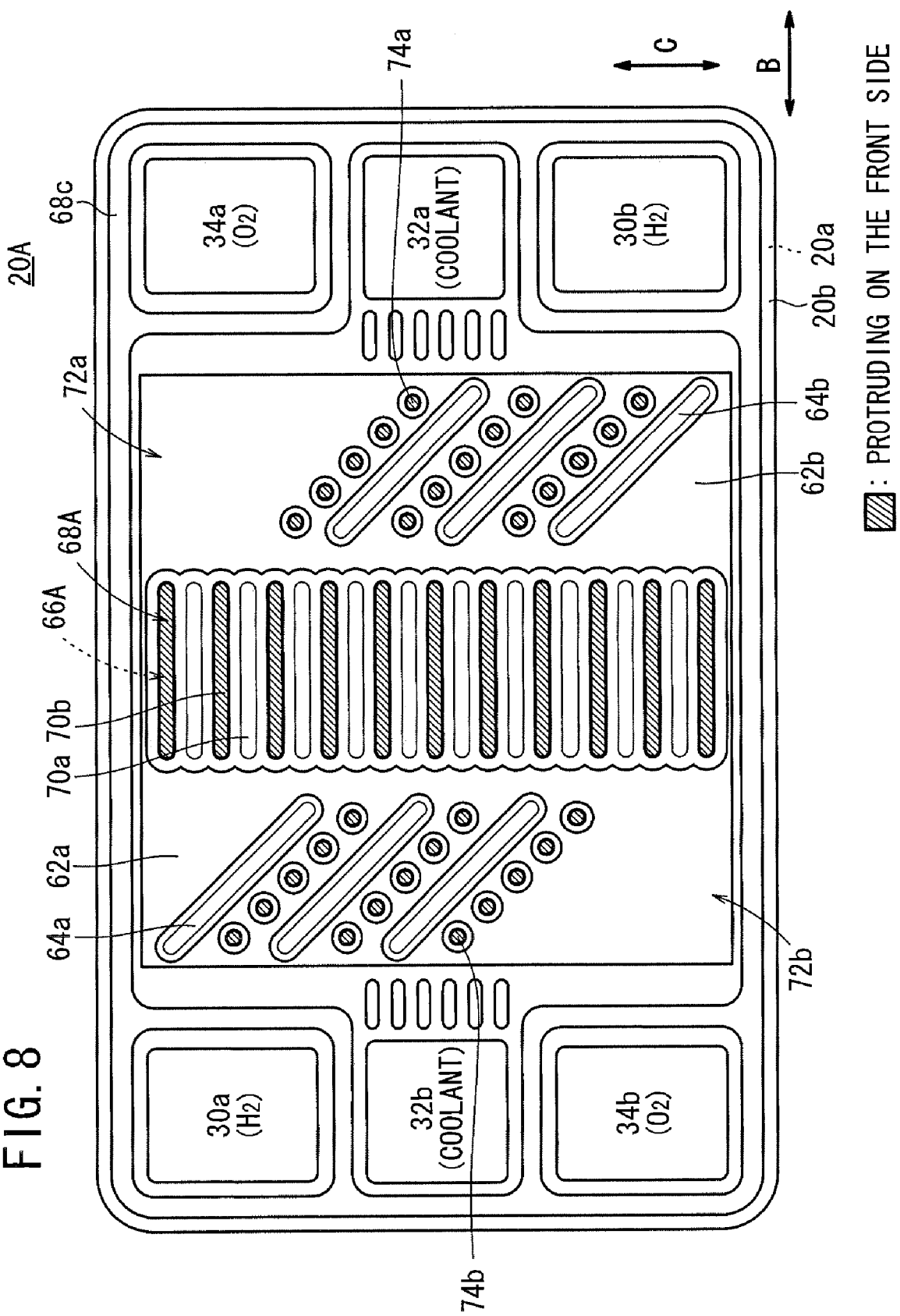
FIG. 8 is a front view showing a third metal separator of the first cell unit.

As shown in FIG. 8, the second coolant flow field 68A includes a plurality of straight flow grooves 70a along the power generation surface extending in the direction indicated by the arrow B. The straight flow grooves 70a are arranged in the direction indicated by the arrow C. An inlet buffer 72a and an outlet buffer 72b are provided adjacent to the inlet and the outlet of the straight flow grooves 70a, respectively.

The straight flow grooves 70a are formed between straight flow field ridges 70b protruding from the surface 20b. The inlet buffer 72a and the outlet buffer 72b include bosses 74a, 74b protruding from the intermediate height area 62b, 62a on the side of the second coolant flow field 68A, respectively.

In the first cell unit 12A, when the first membrane electrode assembly 16a is sandwiched between the first metal separator 14A and the second metal separator 18A, the bosses 46a of the first oxygen-containing gas flow field 36A and the continuous guide ridges 64b of the first fuel gas flow field 54A are provided at the same position in the stacking direction, and the bosses 46b of the first oxygen-containing gas flow field 36A and the continuous guide ridges 64a of the first fuel gas flow field 54A are provided at the same position in the stacking direction. Thus, the first membrane electrode assembly 16a is sandwiched between the bosses 46a, 46b and the continuous guide ridges 64b, 64a.

Likewise, when the second membrane electrode assembly 16b is sandwiched between the second metal separator 18A and the third metal separator 20A, the bosses 46a of the second oxygen-containing gas flow field 56A and the continuous guide ridges 64b of the second fuel gas flow field 66A are provided at the same position in the stacking direction, and the bosses 46b of the second oxygen-containing gas flow field 56A and the continuous guide ridges 64a of the second fuel gas flow field 66A are provided at the same position in the stacking direction. Thus, the second membrane electrode assembly 16b is sandwiched between the bosses 46a, 46b and the continuous guide ridges 64b, 64a.

As shown in FIG. 2, a first seal member 68a is formed integrally with the surfaces 14a, 14b of the first metal separator 14A, around the outer circumferential end of the first metal separator 14A. A second seal member 68b is formed integrally with the surfaces 18a, 18b of the second metal separator 18A, around the outer circumferential end of the second metal separator 18A. A third seal member 68c is formed integrally with the surfaces 20a, 20b of the third metal separator 20A, around the outer circumferential end of the third metal separator 20A.

Figure 9:
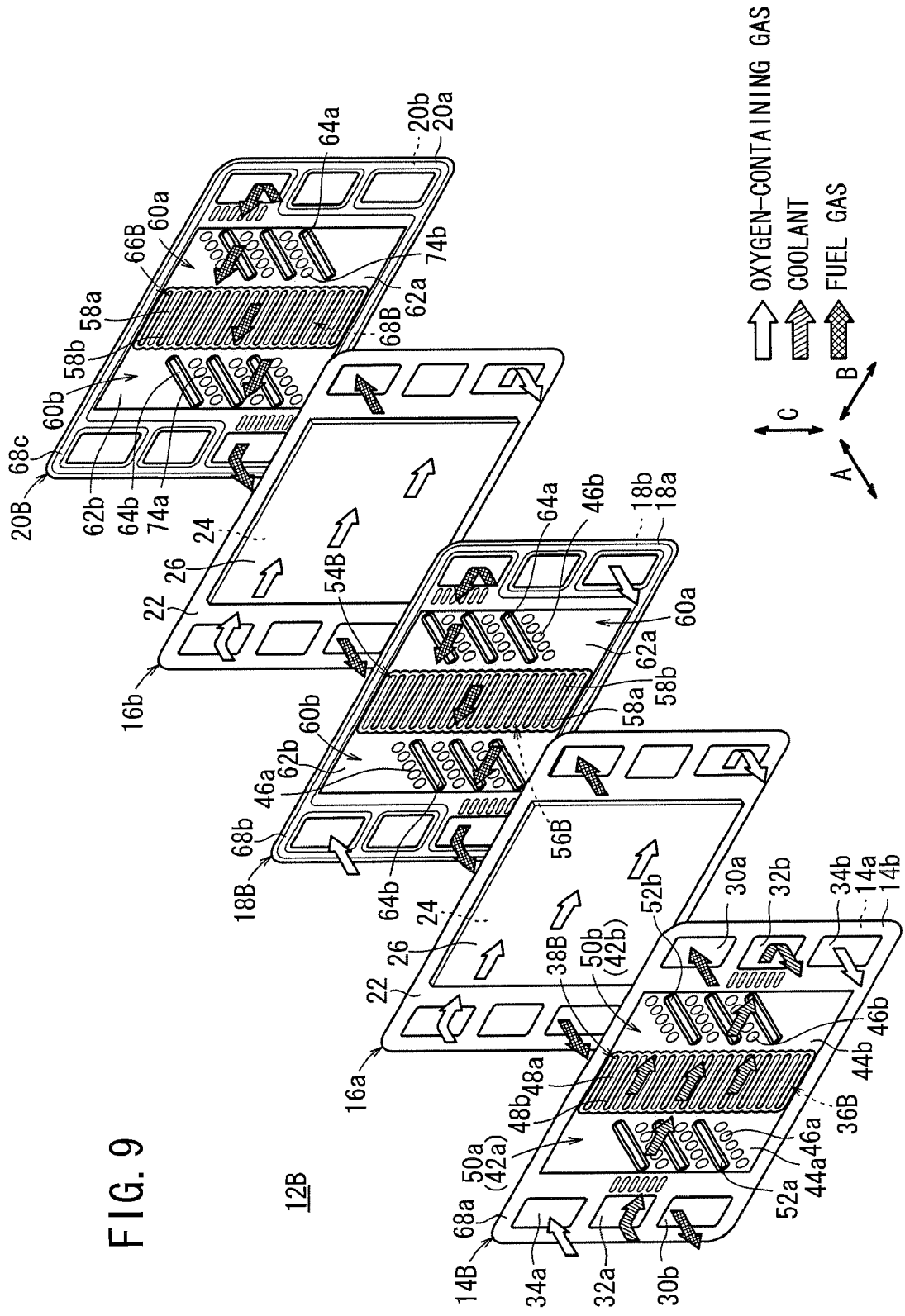
FIG. 9 is an exploded perspective view showing a second cell unit of the fuel cell.

As shown in FIG. 9, the second cell unit 12B includes a first metal separator 14B, a first membrane electrode assembly 16a, a second metal separator 18B, a second membrane electrode assembly 16b, and a third metal separator 20B. The constituent elements of the second cell unit 12B that are identical to those of the first cell unit 12A are labeled with the same reference numerals, and description thereof will be omitted.

The first metal separator 14B has a first oxygen-containing gas flow field (fluid flow field) 36B on its surface 14a facing the first membrane electrode assembly 16a. The first oxygen-containing gas flow field (fluid flow field) 36B is connected between the oxygen-containing gas supply passage 34a and the oxygen-containing gas discharge passage 34b. The first coolant flow field (fluid flow field) 38B is formed on a surface 14b of the first metal separator 14B, on the back of the first oxygen-containing gas flow field 36B.

In the first oxygen-containing gas flow fields 36A, 36B, the phases of the straight flow field ridges 40b are different from each other, i.e., the ridges and grooves are provided reversely on the front and back sides. In the first coolant flow fields 38A, 38B, the phases of the straight flow field ridges 48b are different from each other, i.e., the ridges and grooves are provided reversely on the front and back sides. The phases between the bosses 46a, 46b are different from each other, and the phases between the continuous guide ridges 52a, 52b are different from each other. The order of the bosses 46a and the continuous guide ridges 52a that are arranged alternately in the separator 14A is opposite to the order thereof in the separator 14B. Also, the order of the bosses 46b and the continuous guide ridges 52b that are arranged alternately in the separator 14A is opposite to the order thereof in the separator 14B.

The second metal separator 18B has a first fuel gas flow field (fluid flow field) 54B on its surface 18a facing the first membrane electrode assembly 16a, and a second oxygen-containing gas flow field (fluid flow field) 56B on its surface 18b facing the second membrane electrode assembly 16b, on the back of the first fuel gas flow field 54B.

In the first fuel gas flow fields 54A, 54B, the phases of the straight flow field ridges 58b are different from each other, i.e., the ridges and grooves are provided reversely on the front and back sides. In the second oxygen-containing gas flow fields 56A, 56B, the phases of the straight flow field ridges 40b are different from each other, i.e., the ridges and grooves are provided reversely on the front and back sides. The phases between the bosses 46a, 46b are different from each other, and the phases between the continuous guide ridges 64a, 64b are different from each other. The order of the bosses 46a and the continuous guide ridges 64b that are arranged alternately in the separator 18A is opposite to the order thereof in the separator 18B. Also, the order of the bosses 46b and the continuous guide ridges 64a that are arranged alternately in the separator 18A is opposite to the order thereof in the separator 18B.

The third metal separator 20B has a second fuel gas flow field (fluid flow field) 66B on its surface 20a facing the second membrane electrode assembly 16b, and has a second coolant flow field (fluid flow field) 68B on a surface 20b opposite to the surface 20a, on the back of the second fuel gas flow field 66B.

In the second fuel gas flow fields 66A, 66B, the phases between the straight flow field ridges 58b are different from each other, and the phases between the continuous guide ridges 64a, 64b are different from each other. In the second coolant flow fields 68A, 68B, the phases between the straight flow field ridges 70b are different from each other, and the phases between the bosses 74a, 74b are different from each other.

Operation of the fuel cell 10 will be described.

Firstly, as shown in FIG. 1, an oxygen-containing gas is supplied to the oxygen-containing gas supply passage 34a, and a fuel gas such as a hydrogen-containing gas is supplied to the fuel gas supply passage 30a. Further, pure water, ethylene glycol, or oil is supplied to the coolant supply passage 32a.

In the first cell unit 12A, as shown in FIG. 2, the oxygen-containing gas is supplied from the oxygen-containing gas supply passage 34a into the first oxygen-containing gas flow field 36A of the first metal separator 14A and the second oxygen-containing gas flow field 56A of the second metal separator 18A.

As shown in FIG. 3, in the first metal separator 14A, after the oxygen-containing gas flows into the inlet buffer 42a, the oxygen-containing gas flows along each of the straight flow grooves 40a in the horizontal direction indicated by the arrow B, and the oxygen-containing gas is supplied to the cathode 26 of the first membrane electrode assembly 16a for inducing an electrochemical reaction at the cathode 26. In the second metal separator 18A, as shown in FIG. 7, after the oxygen-containing gas flows into the inlet buffer 42a, the oxygen-containing gas flows along each of the straight flow grooves 40a in the horizontal direction indicated by the arrow B, and the oxygen-containing gas is supplied to the cathode 26 of the second membrane electrode assembly 16b for inducing an electrochemical reaction at the cathode 26.

The fuel gas is supplied from the fuel gas supply passage 30a to the first fuel gas flow field 54A of the second metal separator 18A. As shown in FIG. 6, after the fuel gas flows into the inlet buffer 60a, the fuel gas flows along each of the straight flow grooves 58a in the horizontal direction indicated by the arrow B, and the fuel gas is supplied to the anode 24 of the first membrane electrode assembly 16a for inducing an electrochemical reaction at the anode 24.

Further, the fuel gas is supplied to the second fuel gas flow field 66A of the third metal separator 20A. After the fuel gas flows into the inlet buffer 60a, the fuel gas flows along each of the straight flow grooves 58a in the horizontal direction indicated by the arrow B, and the fuel gas is supplied to the anode 24 of the second membrane electrode assembly 16b for inducing an electrochemical reaction at the anode 24.

Thus, in each of the first and second membrane electrode assemblies 16a, 16b, the oxygen-containing gas supplied to the cathode 26 and the fuel gas supplied to the anode 24 are consumed in the electrochemical reactions at catalyst layers of the cathode 26 and the anode 24 for generating electricity.

Then, the oxygen-containing gas supplied to and consumed at each cathode 26 of the first and second membrane electrode assemblies 16a, 16b is discharged along the oxygen-containing gas discharge passage 34b in the direction indicated by the arrow A. Likewise, the fuel gas supplied to and consumed at each anode 24 of the first and second membrane electrode assemblies 16a, 16b is discharged to the fuel gas discharge passage 30b.

The coolant supplied to the coolant supply passage 32a flows into the first coolant flow field 38A formed between the first metal separator 14A of the first cell unit 12A and the third metal separator 20B of the second cell unit 12B, and into the first coolant flow field 38B formed between the third metal separator 20A of the first cell unit 12A and the first metal separator 14B of the second cell unit 12B. The coolant moves in the direction indicated by the arrow B to cool the first and second membrane electrode assemblies 16a, 16b, and then, the coolant is discharged into the coolant discharge passage 32b.

In the second cell unit 12B, as in the case of the first cell unit 12A, power generation is performed in the first and second membrane electrode assemblies 16a, 16b.

In the first embodiment, in the first cell unit 12A, the bosses 46a, 46b protruding toward the first membrane electrode assembly 16a in the inlet buffer 42a and the outlet buffer 42b of the first metal separator 14A and the continuous guide ridges 64b, 64a protruding toward the first membrane electrode assembly 16a in the outlet buffer 60b and the inlet buffer 60a of the second metal separator 18A are provided at the same positions in the stacking direction.

In the structure, the first membrane electrode assembly 16a is held (sandwiched) between the bosses 46a, 46b of the first metal separator 14A and the continuous guide ridges 64b, 64a of the second metal separator 18A reliably.

As shown in FIG. 6, the first fuel gas flow field 54A includes the continuous guide ridges 64a, 64b in the inlet buffer 60a and the outlet buffer 60b, and the continuous guide ridges 64a, 64b protrude toward the first membrane electrode assembly 16a. Thus, since the fuel gas is guided by the continuous guide ridges 64a, 64b, the fuel gas smoothly flows along the first fuel gas flow field 54A. The desired power generation function is maintained reliably.

Likewise, the bosses 46a, 46b protruding toward the second membrane electrode assembly 16b in the inlet buffer 42a and the outlet buffer 42b of the second metal separator 18A and the continuous guide ridges 64b, 64a protruding toward the second membrane electrode assembly 16b in the outlet buffer 60b and the inlet buffer 60a of the third metal separator 20A are provided at the same positions in the stacking direction. In the structure, the second membrane electrode assembly 16b is held (sandwiched) between the bosses 46a, 46b of the second metal separator 18A and the continuous guide ridges 64b, 64a of the third metal separator 20A reliably.

Further, the second fuel gas flow field 66A includes the continuous guide ridges 64a, 64b in the inlet buffer 60a and the outlet buffer 60b. Thus, by the guiding action of the continuous guide ridges 64a, 64b, the fuel gas smoothly flows along the second fuel gas flow field 66A.

Figure 10:
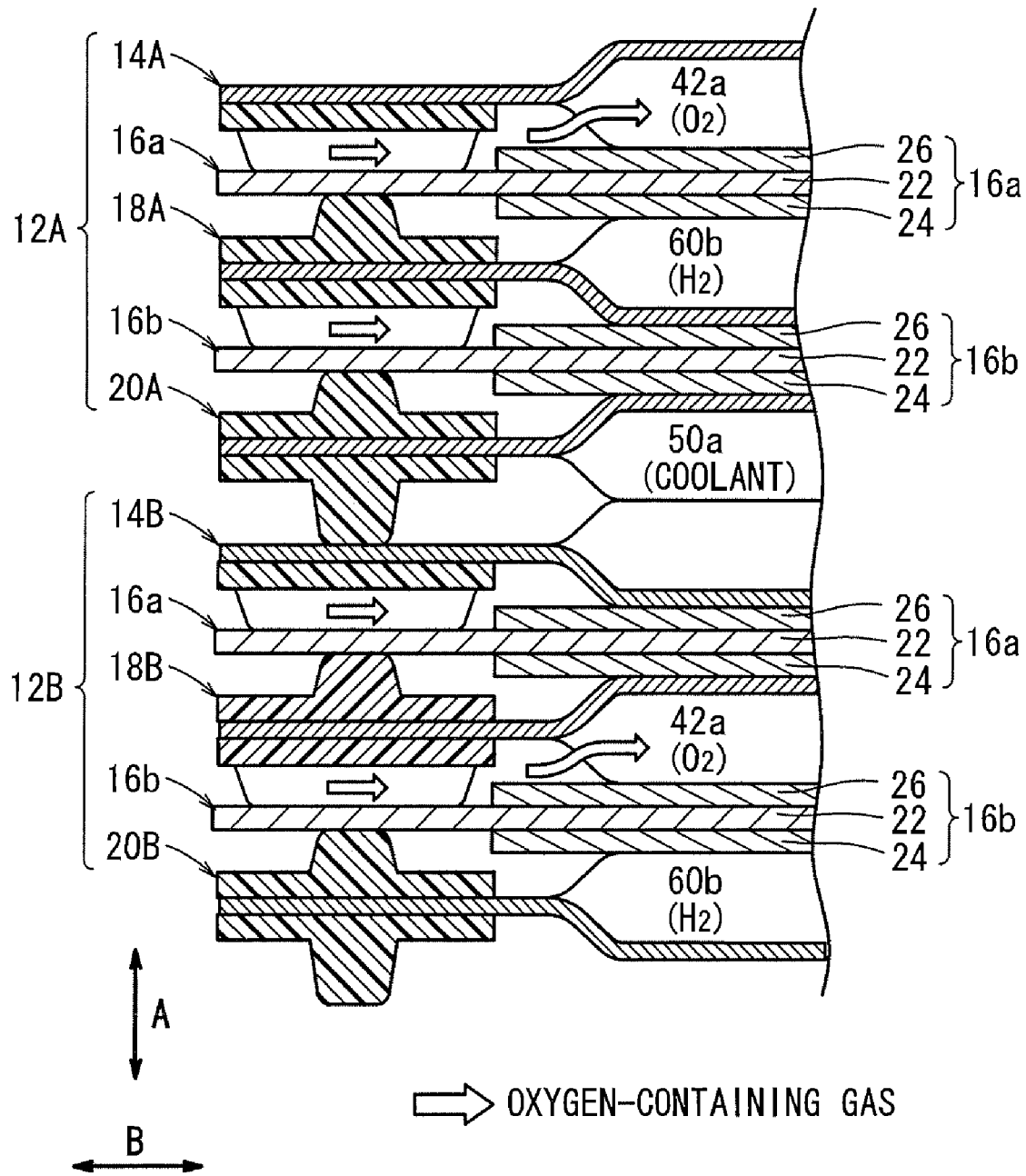
FIG. 10 is a cross sectional view showing the fuel cell, taken along a line X-X in FIG. 2.
Figure 11:
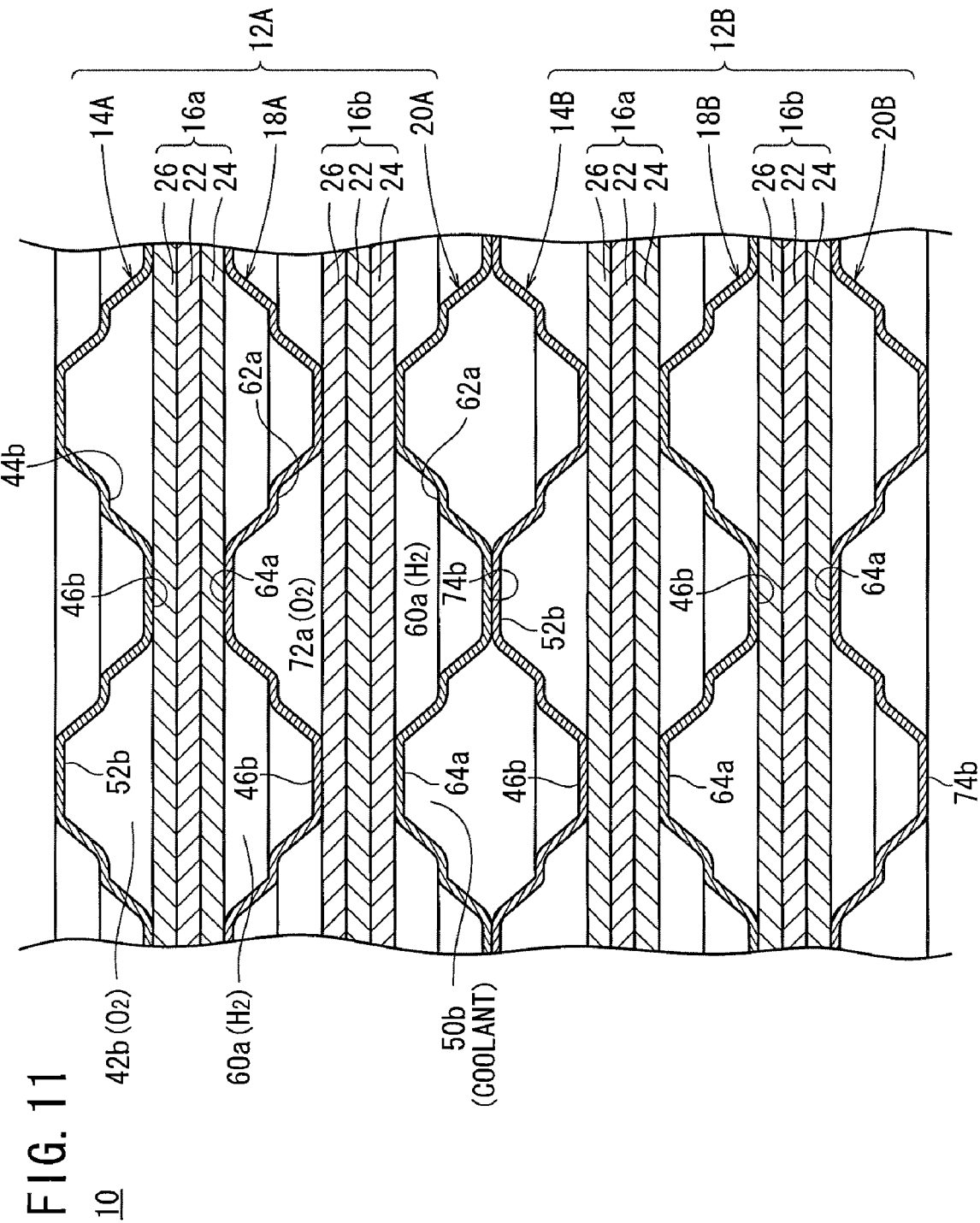
FIG. 11 is a cross sectional view showing the fuel cell, taken along a line XI-XI in FIG. 2.

Further, in the first embodiment, in the first cell unit 12A and the second cell unit 12B, the first oxygen-containing gas flow fields 36A, 36B, the first fuel gas flow fields 54A, 54B, the second oxygen-containing gas flow fields 56A, 56B, and the second fuel gas flow fields 66A, 66B have different phases from each other (see FIGS. 10 and 11).

Thus, when the first metal separator 14A of the first cell unit 12A is overlapped with the third metal separator 20B of the second cell unit 12B, the continuous guide ridges 52a, 52b and the bosses 74a, 74b are overlapped with each other in the stacking direction.

Likewise, when the third metal separator 20A of the first cell unit 12A is overlapped with the first metal separator 14B of the second cell unit 12B, the bosses 74a, 74b are overlapped with the continuous guide ridges 52a, 52b in the stacking direction.

In the structure, the load applied to the first coolant flow field 38A and the first coolant flow field 38B does not become insufficient. Even if the load at the time of stacking the components of the fuel cell 10 and the pressure during the power generation are fluctuated, the first and second membrane electrode assemblies 16a, 16b are held reliably.

Thus, damage to the first and second membrane electrode assemblies 16a, 16b, and deformation of the separators are prevented as much as possible. Also, the coolant, the fuel gas, and the oxygen-containing gas flow through the fuel cell 10 smoothly. Further, by adopting the skip cooling structure, reduction in the overall size and weight of the fuel cell 10 is achieved easily.

Further, the continuous guide ridges 64a, 64b are provided at positions corresponding to the anode 24. Therefore, in the fuel cell 10 for performing power generation using pure hydrogen and oxygen-containing gas (e.g., air), though the flow rate of the fuel gas is small on the anode side, the water is discharged from the anode 24 smoothly. Thus, power generation is performed stably.

Figure 12:
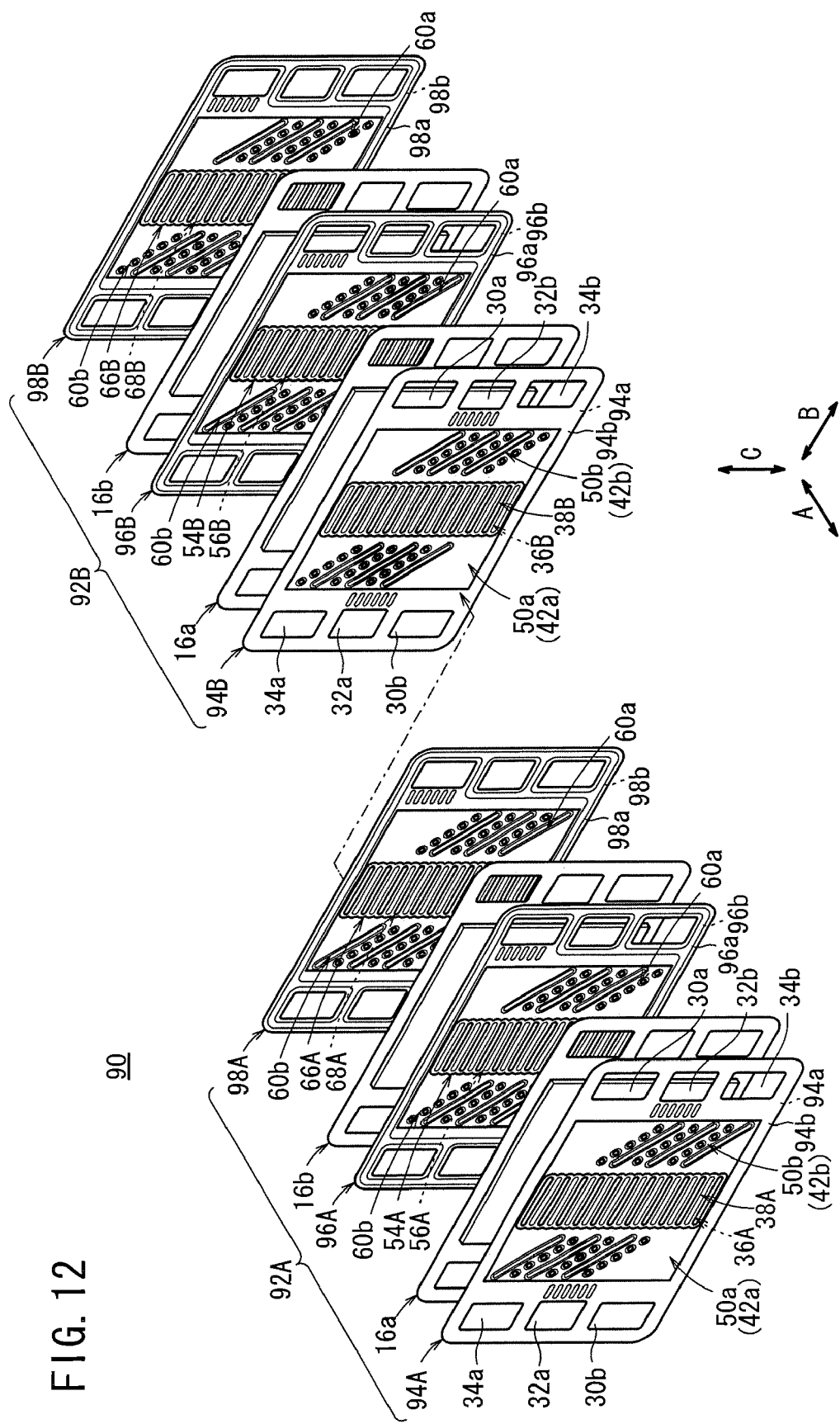
FIG. 12 is an exploded perspective view showing main components of a fuel cell according to a second embodiment of the present invention.

FIG. 12 is an exploded perspective view showing main components of a fuel cell 90 according to a second embodiment of the present invention.

The constituent elements of the fuel cell 90 that are identical to those of the fuel cell 10 are labeled with the same reference numerals, and description thereof will be omitted.

The fuel cell 90 is formed by stacking first cell units 92A and second cell units 92B alternately in the direction indicated by the arrow A. The first cell unit 92A includes a first metal separator 94A, a first membrane electrode assembly 16a, a second metal separator 96A, a second membrane electrode assembly 16b, and a third metal separator 98A (see FIGS. 12 and 13).

Figure 14:
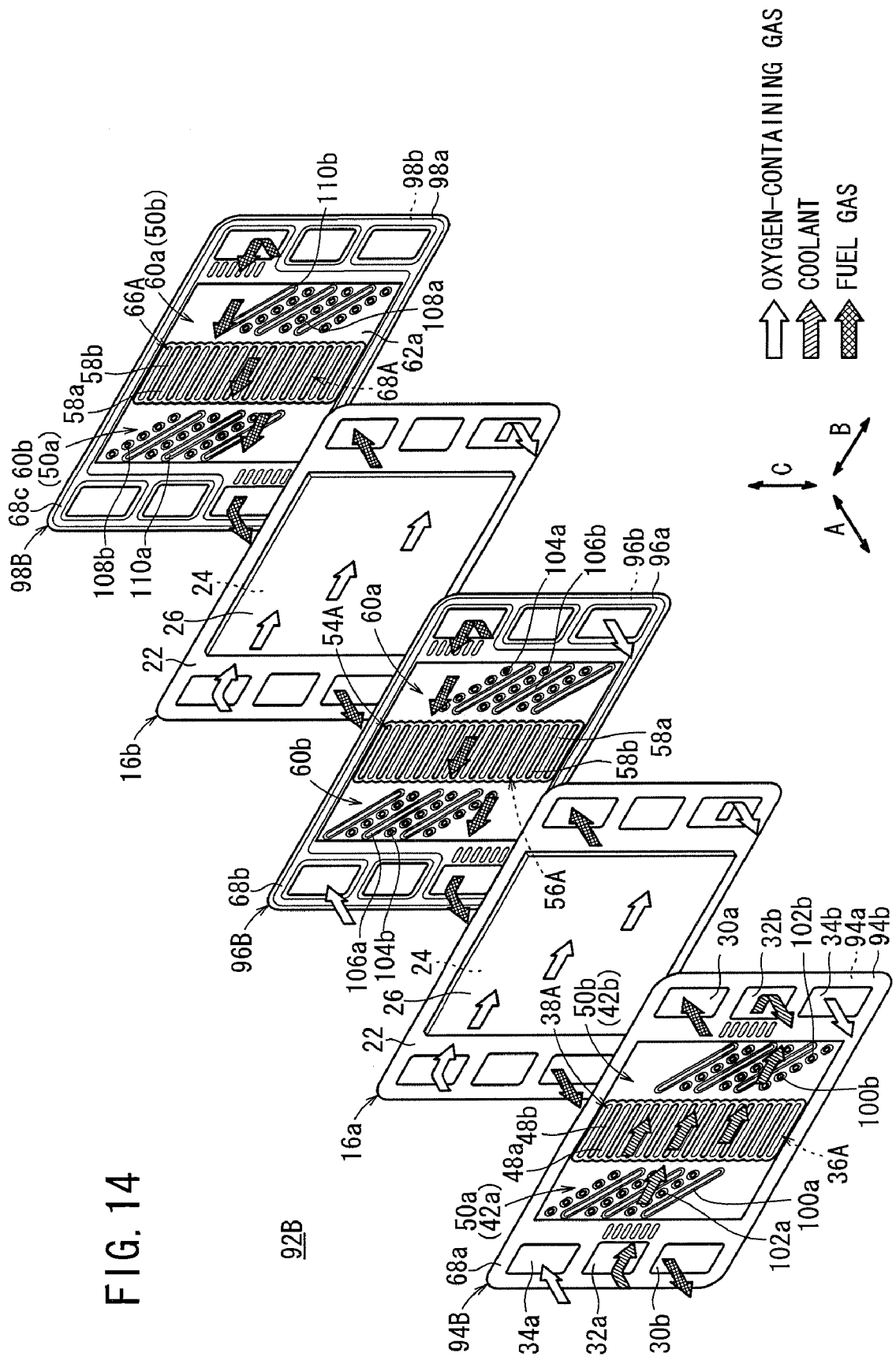
FIG. 14 is an exploded perspective view showing a second cell unit of the fuel cell.

As shown in FIGS. 12 and 14, the second cell unit 92B includes a first metal separator 94B, a first membrane electrode assembly 16a, a second metal separator 96B, a second membrane electrode assembly 16b, and a third metal separator 98B.

Figure 15:
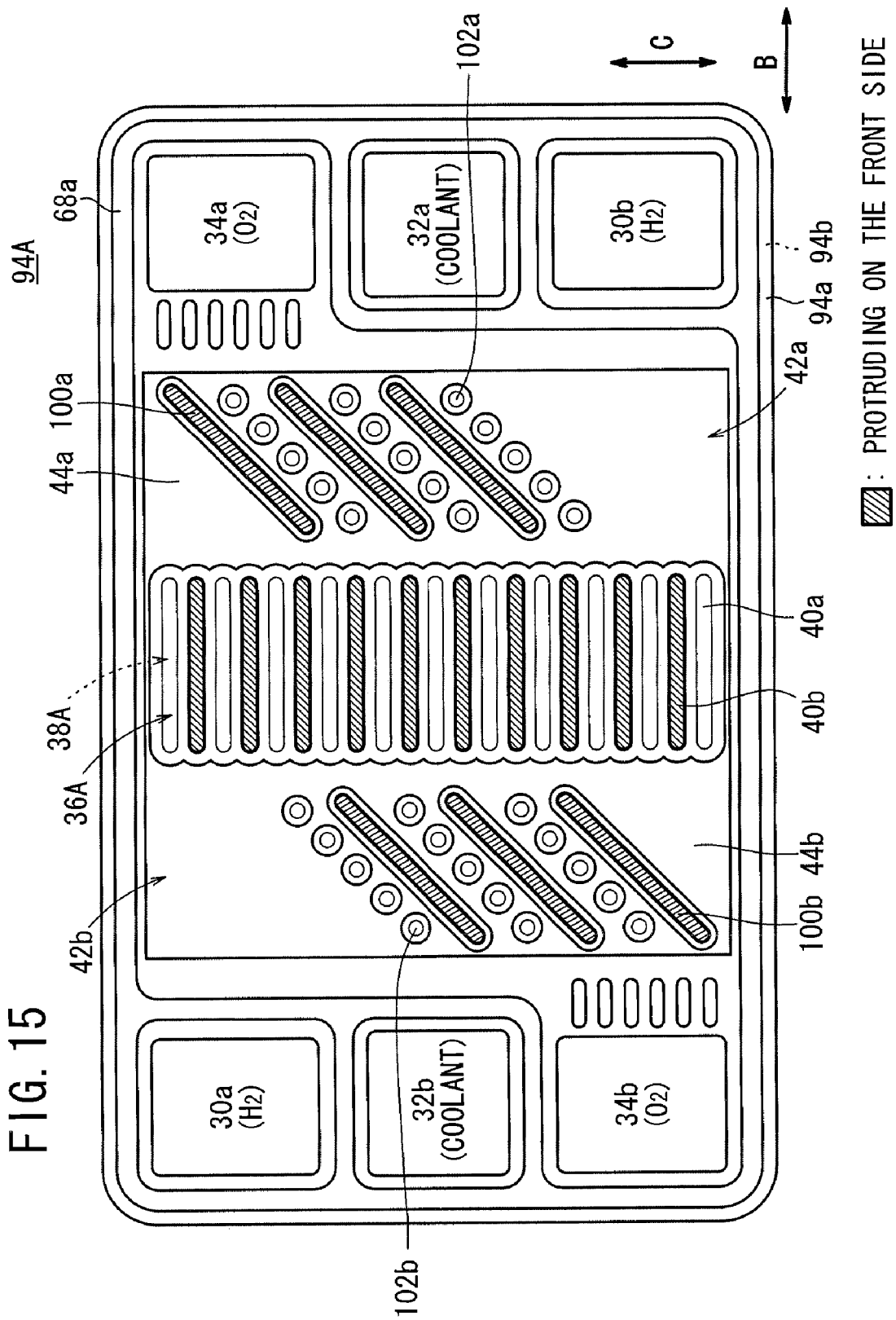
FIG. 15 is a front view showing a first metal separator of the first cell unit.

As shown in FIG. 15, a first oxygen-containing gas flow field 36A is formed on a surface 94a of the first metal separator 94A of the first cell unit 92A. The first oxygen-containing gas flow field 36A has an inlet buffer 42a and an outlet buffer 42b on both ends of straight flow grooves 40a.

Continuous guide ridges 100a, 100b are provided in the inlet buffer 42a and the outlet buffer 42b. The continuous guide ridges 100a, 100b protrude on the side of the first oxygen-containing gas flow field 36A. The continuous guide ridges 100a guide the oxygen-containing gas from the oxygen-containing gas supply passage 34a to the straight flow grooves 40a, and the continuous guide ridges 100b guide the oxygen-containing gas from the straight flow grooves 40a to the oxygen-containing gas discharge passage 34b.

Figure 13:
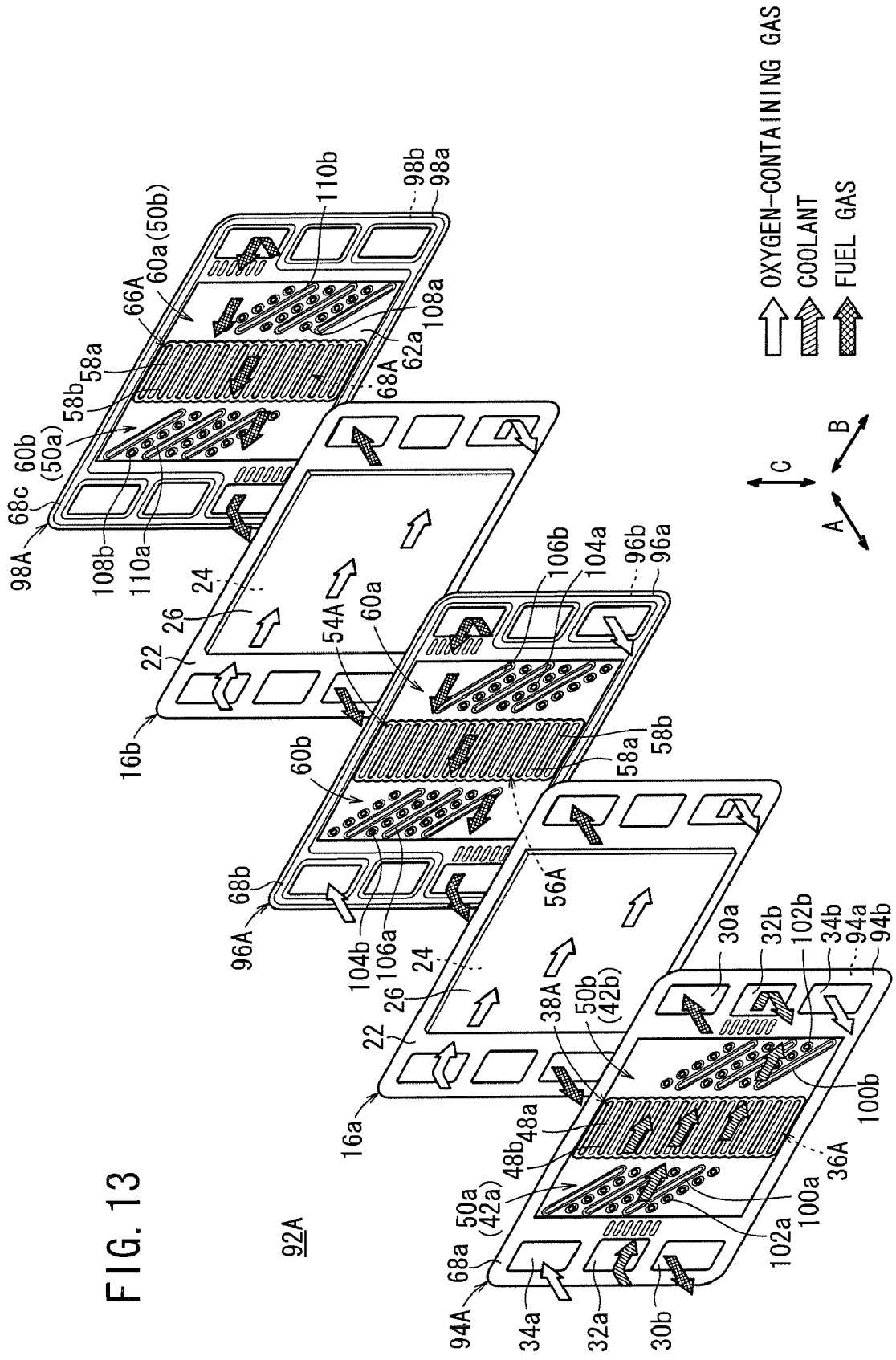
FIG. 13 is an exploded perspective view showing a first cell unit of the fuel cell.

As shown in FIG. 13, a first coolant flow field 38A is formed on a surface 94b of the first metal separator 94A. The first coolant flow field 38A includes an inlet buffer 50a and an outlet buffer 50b. A plurality of bosses 102a, 102b protruding on the side of the first coolant flow field 38A are provided in the inlet buffer 50a and the outlet buffer 50b. The bosses 102a, 102b are arranged in a plurality of rows spaced at predetermined intervals. Each row includes a predetermined number of bosses 102a, 102b. The rows of the bosses 102a, 102b, and the continuous guide ridges 100a, 100b are arranged alternately.

A first fuel gas flow field 54A is formed on a surface 96a of the second metal separator 96A. The first fuel gas flow field 54A includes an inlet buffer 60a and an outlet buffer 60b. A plurality of bosses 104a, 104b protruding on the side of the first fuel gas flow field 54A are formed in the inlet buffer 60a and the outlet buffer 60b.

Figure 16:
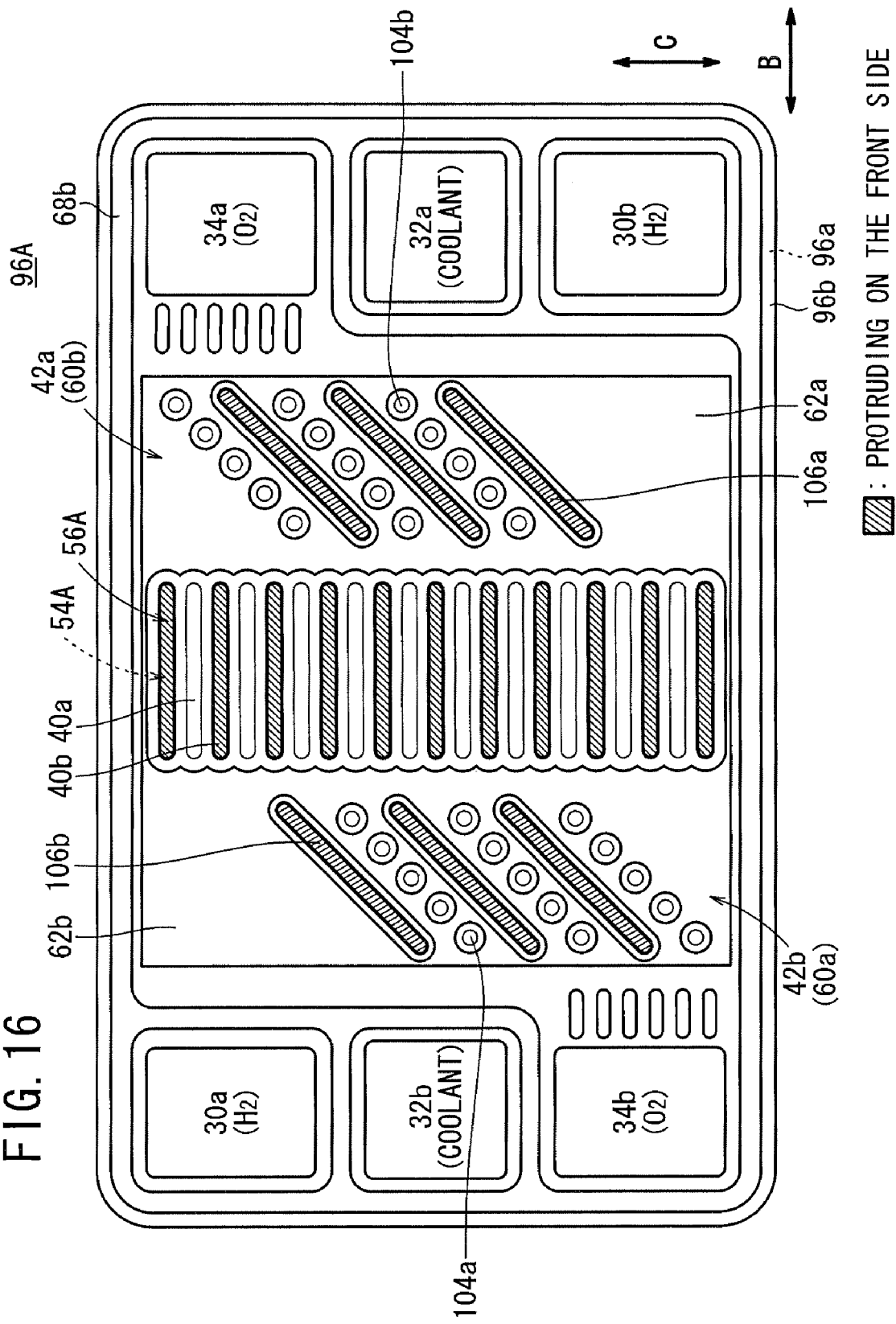
FIG. 16 is a front view showing a second metal separator of the first cell unit.
Figure 17:
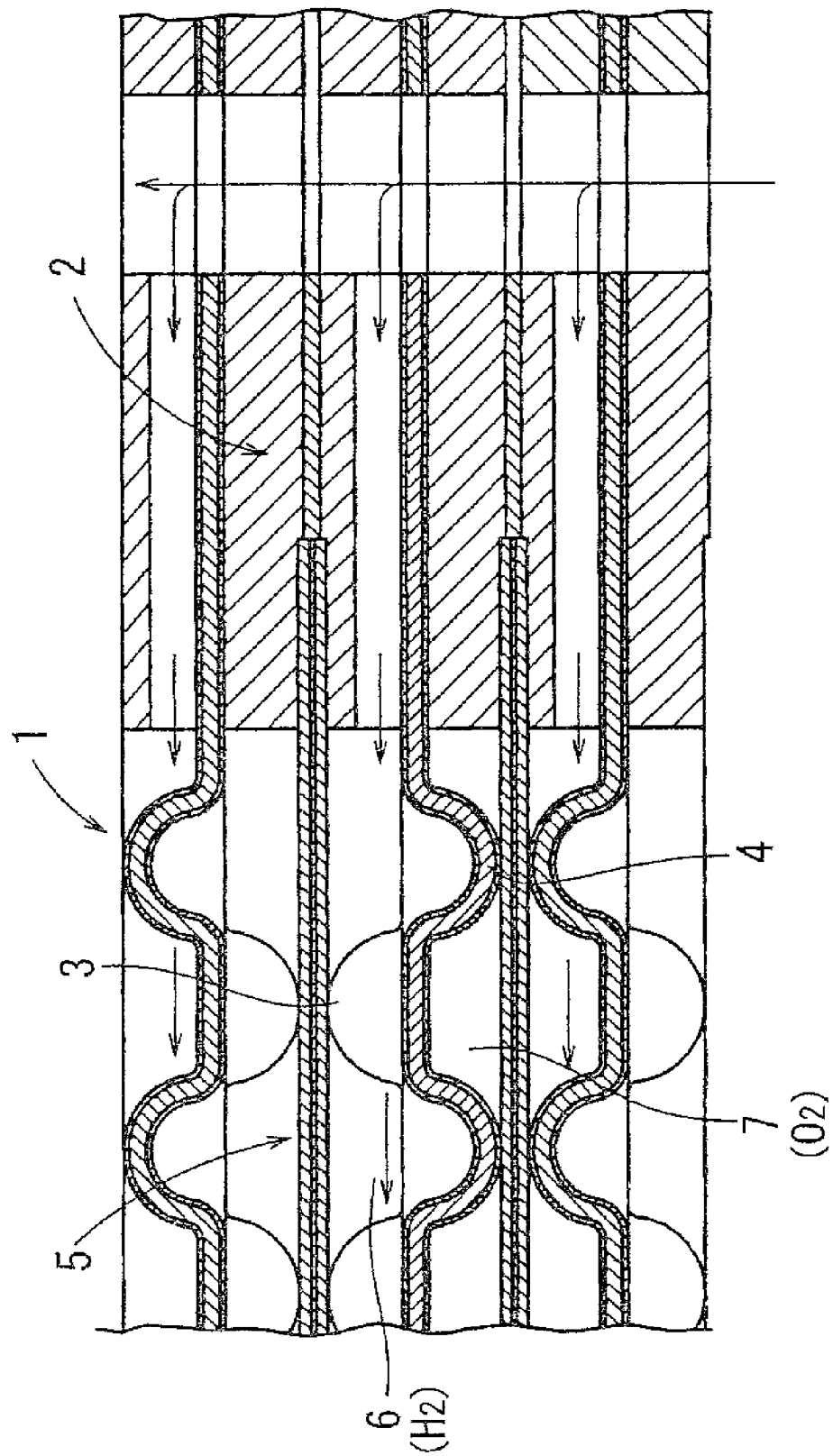
FIG. 17 is a cross sectional view showing a conventional fuel cell.

As shown in FIG. 16, a second oxygen-containing gas flow field 56A is formed on a surface 96b of the second metal separator 96A. A plurality of continuous guide ridges 106a, 106b protruding on the side of the second oxygen-containing gas flow field 56A are formed in the inlet buffer 42a and the outlet buffer 42b of the second oxygen-containing gas flow field 56A.

As shown in FIG. 13, a second fuel gas flow field 66A is formed on a surface 98a of the third metal separator 98A. Bosses 108a, 108b protruding on the side of the second fuel gas flow field 66A are formed in the inlet buffer 60a and the outlet buffer 60b of the second fuel gas flow field 66A. A second coolant flow field 68A is formed on a surface 98b of the third metal separator 98A. A plurality of continuous guide ridges 110a, 110b protruding on the side of the second coolant flow field 68A are formed in the inlet buffer 50a and the outlet buffer 50b of the second coolant flow field 68A.

In the first cell unit 92A, the continuous guide ridges 100a, 100b of the first oxygen-containing gas flow field 36A and the bosses 104b, 104a of the first fuel gas flow field 54A of the second metal separator 96A protrude toward the first membrane electrode assembly 16a. The continuous guide ridges 100a, 100b and the bosses 104b, 104b are overlapped with each other in the stacking direction, and sandwich the first membrane electrode assembly 16a.

The continuous guide ridges 106a, 106b of the second oxygen-containing gas flow field 56A of the second metal separator 96A and the bosses 108b, 108a of the second fuel gas flow field 66A of the third metal separator 98A protrude toward the second membrane electrode assembly 16b, at overlapping positions in the stacking direction to sandwich the second membrane electrode assembly 16b.

In the first cell unit 92A and the second cell unit 92B, the phases of the continuous guide ridges 100a, 100b of the first oxygen-containing gas flow fields 36A, 36B are different from each other, and the phases of the continuous guide ridges 106a, 106b of the second oxygen-containing gas flow fields 56A, 56B are different from each other.

The phases of the bosses 104a, 104b of the first fuel gas flow fields 54A, 54B are different from each other, and the phases of the bosses 108a, 108b of the second fuel gas flow fields 66A, 66B are different from each other.

In the second embodiment, for example, the continuous guide ridges 100a, 100b of the first metal separator 94A and the bosses 104b, 104a of the second metal separator 96A are overlapped with each other in the stacking direction. In the structure, the first membrane electrode assembly 16a can be held reliably between the continuous guide ridges 100a, 100b and the bosses 104b, 104a.

Further, the continuous guide ridges 100a, 100b protruding on the side of the first oxygen-containing gas flow field 36A are provided in the inlet buffer 42a and the outlet buffer 42b of the first oxygen-containing gas flow field 36A. In the structure, by the guiding action of the continuous guide ridges 100a, 100b, the oxygen-containing gas smoothly flows along the first oxygen-containing gas flow field 36A. Therefore, the desired power generation performance is maintained reliably.

Further, the first cell unit 92A and the second cell unit 92B have different phases, and the load applied to the first coolant flow field 38A and the second coolant flow field 68A does not become insufficient. Thus, in the second embodiment, the same advantages as in the case of the first embodiment are obtained.

Though the skip cooling structure is adopted in the first and second embodiments, the present invention is not limited in this respect. For example, the present invention is applicable to a fuel cell having cell units each including a pair of separators sandwiching a single membrane electrode assembly, wherein a coolant flow field is formed between each cell unit.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell formed by stacking a membrane electrode assembly and a metal separator in a form of a corrugated plate in a stacking direction, the membrane electrode assembly including a pair of electrodes and an electrolyte interposed between the electrodes, a first fluid flow field and a buffer as a passage for one of a fuel gas, an oxygen-containing gas and a coolant being formed on one surface of the metal separator, a second fluid flow field and a buffer as a passage for another one of the fuel gas, the oxygen-containing gas and the coolant being formed on an opposed surface of the metal separator, the metal separator comprising first and second metal separators, the membrane electrode assembly being sandwiched between the first and second metal separators or the first and second metal separators directly contacting each other, wherein the first metal separator has a plurality of rows of bosses protruding toward the second metal separator in the buffer and a plurality of continuous guide ridges, wherein the plurality of rows of bosses and the plurality of continuous guide ridges are alternately arranged on the separator;

the second metal separator has a plurality of continuous guide ridges protruding toward the first metal separator in the buffer and a plurality of rows of bosses, wherein the plurality of rows of bosses and the plurality of continuous guide ridges are alternately arranged on the separator; and wherein the plurality of rows of bosses and the plurality of continuous guide ridges are provided at positions overlapped with each other in the stacking direction.

2. A fuel cell according to claim 1, wherein the fuel cell comprises cell units each formed by stacking a first membrane electrode assembly on a cathode side metal separator, an intermediate metal separator on the first membrane electrode assembly, a second membrane electrode assembly on the intermediate metal separator, and an anode side metal separator on the second membrane electrode assembly;

in adjacent cell units, the bosses and the continuous guide ridges of one of the adjacent cell units and the bosses and the continuous guide ridges of the other of the adjacent cell units are provided in different phases.

* * * * *